US008718165B2

(12) United States Patent
Hui et al.

(10) Patent No.: US 8,718,165 B2
(45) Date of Patent: May 6, 2014

(54) METHOD AND APPARATUS FOR CONTROLLING MULTI-ANTENNA TRANSMISSION IN A WIRELESS COMMUNICATION NETWORK

(75) Inventors: Dennis Hui, Cary, NC (US); Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2017 days.

(21) Appl. No.: 11/763,192

(22) Filed: Jun. 14, 2007

(65) Prior Publication Data

US 2008/0310523 A1    Dec. 18, 2008

(51) Int. Cl.
*H04B 7/02*        (2006.01)
(52) U.S. Cl.
USPC ........... 375/267; 375/260; 375/262; 375/265; 375/340; 375/343; 375/346; 375/350
(58) Field of Classification Search
USPC ......... 375/260, 267, 262, 265, 340, 343, 346, 375/350; 370/203, 204, 205, 208, 209, 210
See application file for complete search history.

(56) References Cited

U.S. PATENT DOCUMENTS

| | | | |
|---|---|---|---|
| 2004/0066761 A1* | 4/2004 | Giannakis et al. | 370/329 |
| 2004/0132416 A1 | 7/2004 | Yee | |
| 2006/0039497 A1* | 2/2006 | Vu et al. | 375/267 |
| 2006/0098754 A1 | 5/2006 | Kim et al. | |
| 2006/0203891 A1 | 9/2006 | Sampath et al. | |
| 2007/0174038 A1* | 7/2007 | Wang et al. | 704/1 |
| 2009/0180567 A1 | 7/2009 | She et al. | |

FOREIGN PATENT DOCUMENTS

| | | |
|---|---|---|
| EP | 1780925 A2 | 5/2007 |
| JP | 2006503485 A | 1/2006 |
| WO | 2007058264 A1 | 5/2007 |

OTHER PUBLICATIONS

Sampath, H. et al. "Linear Precoding for Space-Time Coded Systems with Known Fading Correlations." IEEE Communications Letters, vol. 6, No. 6, Jun. 2002, pp. 239-241.
Simon, S.H et al. "Optimizing MIMO Antenna Systems with Channel Covariance Feedback." IEEE JSAC, vol. 21, pp. 406-417, Apr. 2003.
Telatar, E. "Capacity of Multi-Antenna Gaussian Channels." Euro. Trans. Telecomm. ETT, vol. 10, No. 6, pp. 585-596, Nov. 1999.
Tulino, A.M. et al. "Capacity-Achieving Input Covariance for Single-User Multi-Antenna Channels." IEEE Trans. on Wireless Comm., vol. 5, pp. 662-671, Mar. 2006.
Visotsky, E. et al. "Space-Time Transmit Precoding with Imperfect Feedback." IEEE Trans. on Info. Thy., vol. 47, pp. 2632-2639, Sep. 2001.

(Continued)

*Primary Examiner* — Dhaval Patel
(74) *Attorney, Agent, or Firm* — Coats and Bennett PLLC

(57) ABSTRACT

Multi-antenna transmission control presented herein involves generating a set of virtual channel realizations at the transmitter that shares the same second-order statistics as the actual channel realizations observed for a targeted receiver. By making the control-related quantities of interest at the transmitter depend on the long-term statistics of the channel, the actual channel realizations are not needed for transmission control, e.g., for accurate Multiple-Input-Multiple-Output (MIMO) preceding. As such, the use of virtual channel realizations enables transmission control that approaches the "closed-loop" channel capacity that would be provided by full feedback of the (instantaneous) actual channel realizations, without requiring the overhead signaling burden that attends full feedback.

33 Claims, 3 Drawing Sheets

(56) References Cited

OTHER PUBLICATIONS

Vu, Mai et al. "Optimal Linear Precoders for MIMO Wireless Correlated Channels with Nonzero Mean in Space-Time Coded Systems." IEEE Transactions on Signal Processing, vol. 54, No. 6, Jun. 2006, pp. 2318-2332.

Zhou, Shengli et al. "Optimal Transmitter Eigen-Beamforming and Space-Time Block Coding Based on Channel Mean Feedback." IEEE Transactions on Signal Processing, vol. 50, No. 10, Oct. 2002, pp. 2599-2613.

\* cited by examiner

METHOD AND APPARATUS FOR CONTROLLING MULTI-ANTENNA TRANSMISSION IN A WIRELESS COMMUNICATION NETWORK

BACKGROUND

1. Technical Field

The present invention generally relates to wireless communication systems, and particularly relates to controlling multiple-antenna transmission in a wireless communication network, e.g., controlling the precoding operation and selecting the modulation and channel coding rates for Multiple-Input-Multiple-Output (MIMO) transmission.

2. Background

The availability of certain information about (propagation) channel state at the transmitter plays a crucial role in attaining the highest possible spectral efficiency for a wireless communication system with multiple transmit antennas. For example, E. Telatar, "Capacity of multi-antenna Gaussian channels," Euro. Trans. Telecomm. ETT, vol. 10, no. 6, pp. 585-596, November 1999, demonstrates that substantial gains in capacity can be achieved with multiple antennas when accurate information about the instantaneous channel state is available at the transmitter.

Feedback of instantaneous channel states from targeted receivers to the transmitter represents a known mechanism for providing accurate channel state information, and such feedback may be necessary, such as in Frequency-Division Duplex (FDD) systems where the instantaneous channel states in uplink and downlink are not directly related. Problematically, however, the potential number and complexity of the propagation channels existent in multi-antenna (e.g., MIMO) systems can require significant amounts of channel feedback, which may not be practicable and undesirable in any case. Moreover, even beginning with the questionable assumption that receivers can estimate instantaneous channel states with the requisite accuracy, feedback delays, including computational and signal transmit delays, guarantee that channel feedback obtained at the transmitter lags the actual states observed at the receiver. As such, transmit adjustments do not match the actual instantaneous channel states at the targeted receivers.

As a departure from using instantaneous channel states as a basis for multi-antenna transmission control, some research has instead considered optimal transmission schemes that use long-term statistical information of the propagation channel(s). Unlike instantaneous channel state information which varies at the rate of fast fading, statistical information about the channel varies at a much slower rate (e.g. at the rate of slow fading (shadowing) or at the rate of change in angles of departure/arrival). Consequently, it is much more affordable—in terms of computational and signaling overhead—to accurately feed back statistical channel information from the targeted receivers for corresponding multi-antenna transmission control.

Although basing transmission control on channel statistics feedback significantly reduces the amount and complexity of channel feedback signaling from the targeted receivers, implementing such control is not without its challenges. In practice, the computation of various parameters required for optimal multi-antenna transmission based on channel statistics is often much more difficult than computing them based on instantaneous channel knowledge.

For example, a number of papers present information related to determining the optimal linear precoding matrix $F_{opt}$ that maximizes the ergodic capacity of a flat MIMO channel with $n_T$ transmit antennas and $n_R$ receive antennas. Such papers include, E. Visotsky and U. Madhow, "Space-Time Transmit Precoding with Imperfect Feedback," IEEE Trans. on Info. Thy., vol. 47, pp. 2632-2639, September 2001; S. H. Simon and A. L. Moustakas, "Optimizing MIMO Antenna Systems with Channel Covariance Feedback," IEEE JSAC, vol. 21, pp. 406-417, April 2003; and A. M. Tulino, A. Lozano, S. Verdu, "Capacity-Achieving Input Covariance for Single-User Multi-Antenna Channels," IEEE Trans. on Wireless Comm., vol. 5, pp. 662-671, March 2006.

According to various ones of these teachings, $F_{opt}$ may be calculated as, $$F_{opt} = \underset{tr\{\sum_f FF^H\} \le 1}{\operatorname{argmax}} E[\log\det(I + HFF^H H^H)]. \qquad \text{Eq. (1)}$$

More particularly, it has been shown that the optimal precoding matrix can be written as $$F_{opt} = UD(\sqrt{p_1}, \sqrt{p_2}, \ldots, \sqrt{p_{n_T}}), \qquad \text{Eq. (2)}$$

where U denotes a matrix whose columns are the eigenvectors of $EH^H H$, $D(\sqrt{p_1}, \sqrt{p_2}, \ldots, \sqrt{p_{n_t}})$ denotes a diagonal matrix with $\{\sqrt{p_j}\}_{j=1}^{n_T}$ as the diagonal elements, and where $p_j$ denotes the portion of power assigned to the jth eigen-transmission-mode that corresponds to the jth column of U.

Within the context of the above framework, it has been further shown that the relative power levels $\{p_j\}_{j=1}^{n_T}$ must satisfy the following conditions:

$$p_j = \begin{cases} \dfrac{1 - E[MMSE_j]}{\sum_{i=1}^{n_T}(1 - E[MMSE_i])} & \text{if } E[SINR_j] > \sum_{i=1}^{n_T}(1 - E[MMSE_i]) \\ 0 & \text{otherwise} \end{cases}, \qquad \text{Eq. (3)}$$

where $$MMSE_j = 1 - p_j \tilde{h}_j^H (Q_j + p_j \tilde{h}_j \tilde{h}_j^H)^{-1} \tilde{h}_j \qquad \text{Eq. (4)}$$

$$= \frac{1}{1 + p_j \tilde{h}_j^H Q_j^{-1} \tilde{h}_j},$$

$$SINR_j = \tilde{h}_j^H Q_j^{-1} \tilde{h}_j, \qquad \text{Eq. (5)}$$

$$Q_j = I + \sum_{i \ne j} \tilde{h}_j \tilde{h}_j^H, \qquad \text{Eq. (6)}$$

and $\{\tilde{h}_j\}_{j=1}^{n_T}$ are the column vectors of the transformed channel $\tilde{H} = HU = [\tilde{h}_1, \tilde{h}_2, \ldots, \tilde{h}_{n_T}]$. Note that since the term $MMSE_j$ depends on $\{p_j\}_{j=1}^{n_T}$, the relative power levels $\{p_j\}_{j=1}^{n_T}$ are only implicitly defined.

An iterative algorithm has been proposed for computing $\{p_j\}_{j=1}^{n_T}$ based on the joint probability distribution, denoted by $p(\tilde{H})$, of $\tilde{H}$ (or, alternatively, a joint probability distribution of H). As a first step, the algorithm initializes $\{p_j^{(0)}\}_{j=1}^{n_T}$ such that $\sum_{j=1}^{n_T} p_j^{(0)} = 1$ (e.g. by setting $p_j^{(0)} = 1/n_T$ for all j). Next, the algorithm iterates the fixed point equation until the solution converges:

$$p_j^{(k+1)} = \frac{1 - E[MMSE_j^{(k)}]}{\sum_{i=1}^{n_T}(1 - E[MMSE_j^{(k)}])} \text{ for } j = 1, 2, \ldots, n_T \quad \text{Eq. (7)}$$

where $MMSE_j^{(k)}$ are computed based on Eq. (4) with $p_j$ set to equal $p_j^{(k)}$.

At this point, the algorithm stops if, for every j such that $p_j$ has converged to zero in the above step, $$E[SINR_j] \leq \sum_{i=1}^{n_T}(1 - E[MMSE_i]). \quad \text{Eq. (8)}$$

Otherwise, set $p_j=0$ for j that corresponds to the lowest value of $E[SINR_j]$.

Execution of the steps involving Eq. (7) and Eq. (8) requires computation of several essential quantities, including:

$$E[MMSE_j] = \int \frac{1}{1 + p_j \tilde{h}_j^H \left(I + \sum_{i \neq j} p_i \tilde{h}_i \tilde{h}_i^H\right)^{-1} \tilde{h}_j} p(\tilde{H}) d\tilde{H}, \quad \text{Eq. (9)}$$

and $$E[SINR_j] = \int \tilde{h}_j^H \left(I + \sum_{i \neq j} p_i \tilde{h}_i \tilde{h}_i^H\right)^{-1} \tilde{h}_j p(\tilde{H}) d\tilde{H} \quad \text{Eq. (10)}$$

The computation of Eq. (9) and Eq. (10) requires the joint probability distribution $p(\tilde{H})$ of the instantaneous channel state $\tilde{H}$, which is difficult, if not impossible, to determine even at the receiver, not to mention the transmitter. While the integrals included in these equations of interest can be approximated by averaging over many realizations of $\tilde{H}$ observed at the receiver, that approach includes further complications. Because the quantities of interest depend not only on $\tilde{H}$, but also on the allocated power levels $\{p_j\}_{j=1}^{n_T}$, these quantities need to be evaluated for different values of $\{p_j\}_{j=1}^{n_T}$ in order to compute the optimal power levels. As a result, multiple and/or large sets of realizations of $\tilde{H}$ would need to be stored in the working memory (e.g., RAM) of a targeted receiver. In practice, however, it is undesirable to require sufficient memory and computational power in the targeted receivers to carry out the above algorithm for computation of optimal transmit preceding values.

Besides the computation of preceding weights for multi-antenna transmission, the selection of proper modulation and channel coding rates for each transmission stream based on channel statistics to date has not been adequately addressed. Such considerations depend on the kind of detection algorithm, e.g., successive-interference-cancellation (SIC), being employed at the targeted receiver(s).

SUMMARY

Multi-antenna transmission control presented herein involves generating a set of virtual channel realizations at the transmitter that shares the same second-order statistics as the actual channel realizations observed for a targeted receiver. By making the control-related quantities of interest at the transmitter depend on the long-term statistics of the channel, the actual channel realizations are not needed for transmission control, e.g., Multiple-Input-Multiple-Output (MIMO) precoding and associated modulation and coding selection. As such, the use of virtual channel realizations enables transmission control that approaches the "closed-loop" channel capacity that would be provided by full channel state information feedback, without requiring the overhead signaling burden that attends full feedback.

In one or more embodiments, a method of controlling transmission from a multi-antenna transmitter comprises generating an initial set of "template" channel realizations, which is preferably Gaussian-distributed, determining second-order statistics for actual channel realizations at a targeted receiver, and adapting the initial set of template channel realizations as a function of the second-order channel statistics to obtain virtual channel realizations that reflect the second-order channel statistics of the actual channel realizations. The method further includes determining one or more transmission control parameters as a function of the virtual channel realizations for controlling transmission to the targeted receiver.

The above method and variations of it are implemented, according to one or more embodiments presented herein, at a multi-antenna transmitter configured for use within a wireless communication network. Non-limiting examples include 3G and 4G cellular communication networks. For example, one or more processing circuits, e.g., microprocessor-based or other programmed digital processing logic, may be configured to carry out any of the method embodiments presented herein. Such circuits may be implemented, for example, within a network base station or other transmission node.

Of course, the present invention is not limited to the above features and advantages. Those skilled in the art will recognize further features and advantages upon reading the following detailed description and claims, and upon viewing the accompanying drawings.

DETAILED DESCRIPTION

Figure 1:
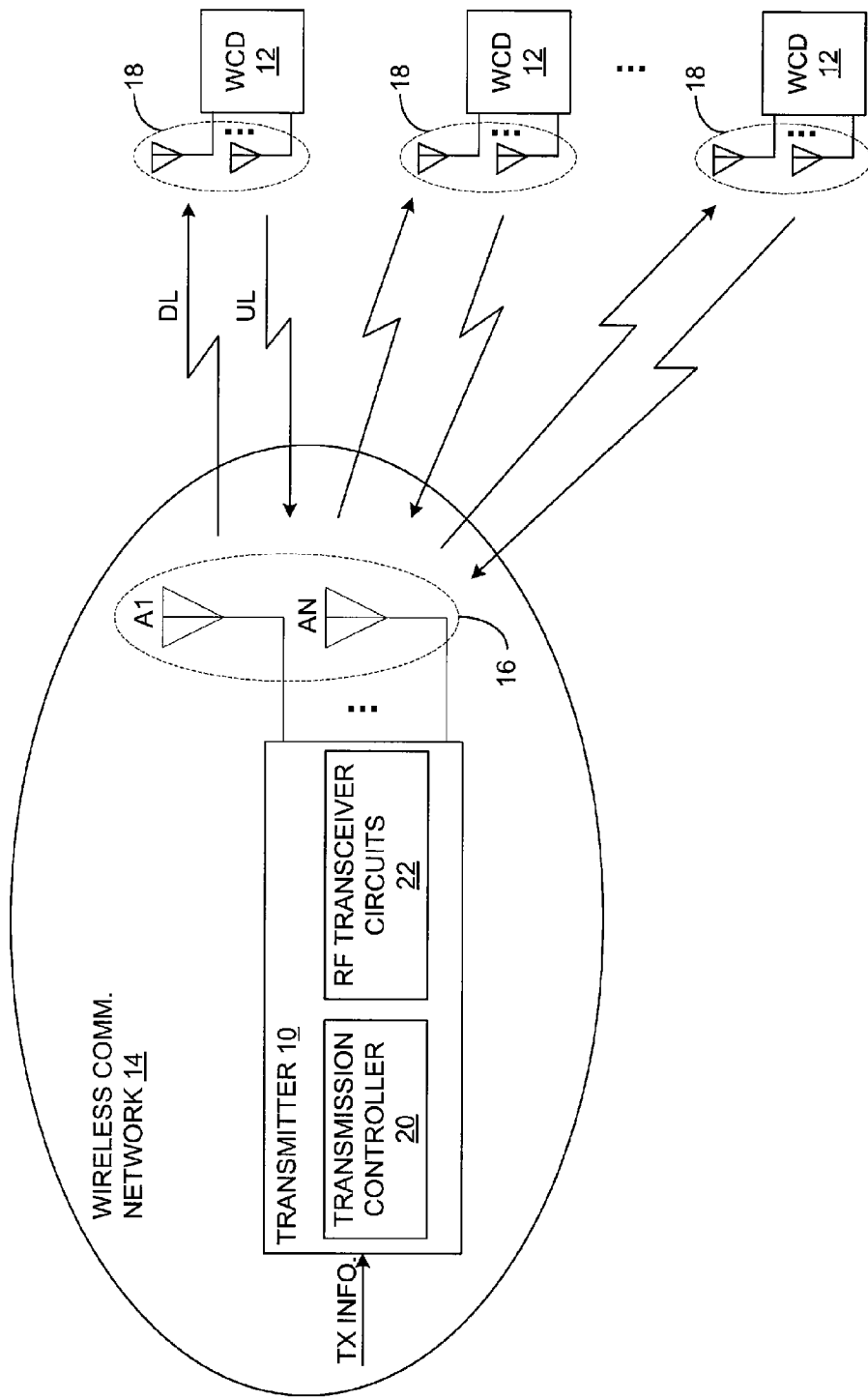
FIG. 1 is a block diagram of one embodiment of a wireless communication network that includes a transmitter having a transmission controller configured to determine one or more transmission control parameters based on second-order channel statistics.

FIG. 1 illustrates one embodiment of a multi-antenna transmitter 10 for transmitting to a plurality of targeted wireless communication devices 12. The wireless communication devices 12 (abbreviated as "WCD" in the figure) may not all be the same, and it should be understood that they represent a multitude of possible device types, such as cellular phones, pagers, Portable Digital Assistants, computers, network access cards, or a mixture of any such devices. As such, for the balance of this discussion, they are simply referred to as "receivers 12." In at least one embodiment, the transmitter 10 is a base station or other transceiver node in a wireless communication network 14, and supports downlink (DL) and uplink (UL) wireless communications to and from the receivers 12. In at least one embodiment, the transmitter 10 is configured for Multiple-Input-Single-Output (MISO) or Multiple-Input-Multiple-Output (MIMO) operation, and the receivers 12 accordingly are equipped with one or more receive antennas 18.

In MIMO operation, the signal(s) intended for a particular one of the receivers 12 are transmitted from selected ones of the antennas 16, and the particular antennas used for transmission, and the relative transmit power allocations can be (and generally are) changed dynamically, in dependence on a number of considerations. Of particular interest herein, the transmitter 10 includes a "transmission controller" 20, which sets, adjusts, or otherwise controls one or more transmission parameters used by the radiofrequency (RF) transceiver circuits 22 of the transmitter 10. As is detailed herein by way of example, the control is advantageously based on the use of second-order channel statistics associated with the actual channel realizations at the targeted receivers 12.

Thus, in at least one embodiment, the transmitter 10 comprises a MIMO transmitter configured for operation in a wireless communication network, wherein it determines one or more transmission control parameters as a function of the virtual channel realizations for controlling (MIMO) transmission to a given receiver 12 by computing transmit precoding weights and coding rates based on the virtual channel realizations for that given receiver 12. The transmit precoding weights set the per-antenna transmit power allocations used for transmitting to the given receiver 12 from respective ones of two or more transmit antennas 16.

In more detail, consider the following simple baseband received-signal model with a flat MIMO channel:

$$r = Hs + w,\qquad\text{Eq. (11)}$$

where H denotes a MIMO channel response (an $n_R \times n_T$ matrix) with zero mean, r denotes the received signal, s denotes the transmitted signal, and w denotes the noise plus interference component in a wireless communication system with $n_T$ transmit antennas and $n_R$ receive antennas. The noise component w may be spatially colored across received antennas with a covariance matrix $R_w = E\{w\, w^H\}$, where $E\{\cdot\}$ denote the expected value of the quantity inside the brackets.

For discussion purposes, at least a given one of the receivers 12 is able to obtain accurate estimates of the channel H relating it to the transmitter 10, and of the noise covariance $R_w$. (Equivalently, where the noise is not zero mean, the given receiver 12 determines noise covariance and the mean.) As a useful working definition, the "whitened channel response" for the given receiver 12 can be determined from H and $R_w$ as, $$\tilde{H} = R_w^{-1/2} H.\qquad\text{Eq. (12)}$$

In at least one aspect of transmission control as taught herein, the given receiver 12 feeds back the second-order statistics of its whitened channel response. In turn, the transmitter 10 uses the second-order statistics to form a set of "virtual channel realizations." The transmitter 10 uses the virtual channel realizations to determine one or more transmission control parameters, such as transmit antenna power allocations for MISO or MIMO transmission preceding and/or modulation and coding scheme (MCS) selections that maximize the communication link capacity.

According to one or more embodiments, the transmitter 10 holds or otherwise maintains pre-computed values that comprise or otherwise represent a set of independent-identically-distributed (IID) Gaussian-distributed matrix samples, denoted by $\{H_{iidg}^{(k)}\}_{k=1}^{N_s}$, of dimension $n_R$ by $n_T$. The variable $N_s$ denotes the number of pre-stored samples, which may be made larger as needed, i.e., a potentially large sample set size may be used.

From one perspective, one may regard the IID Gaussian-distributed samples as a "template" or default model for the actual channel realizations at the given receiver 12, which are not available at the transmitter 10. However, a scaling matrix S of size $n_R$ by $n_T$ and a unitary matrix U of size $n_R n_T$ by $n_R n_T$ are computed and used to scale and transform the individual matrix samples $H_{iidg}^{(k)}$ into a virtual channel realization $H_v^{(k)}$. That is, in such embodiments, the initial set of template channel realizations used for virtual channel realization comprises a set of (IID) Gaussian-distributed samples.

Mathematically, each virtual channel realization is generated according to $$\overline{H}_v^{(k)} = mat_{n_R, n_T}\bigl(U vec\bigl(S \cdot H_{iidg}^{(k)}\bigr)\bigr),\qquad\text{Eq. (13)}$$

where, generically, the notation "A·B" denotes the component-wise product of two matrices, A and B, with the same dimensions, vec(A) denotes a vector formed by stacking all columns of A into a single vector, and $mat_{m,n}(X)$ denotes an m by n matrix formed by re-shaping the mn-dimensional vector X.

Notably, the above virtual channel realizations are created from template data, i.e., the IID Gaussian-distributed matrix samples, which may be pre-computed and held in memory (or generated on the fly once, at startup, or as needed or desired). More particularly, they are created without any requirement for knowing anything about actual channel conditions (although it is assumed that the Gaussian distribution model is valid).

Figure 2:
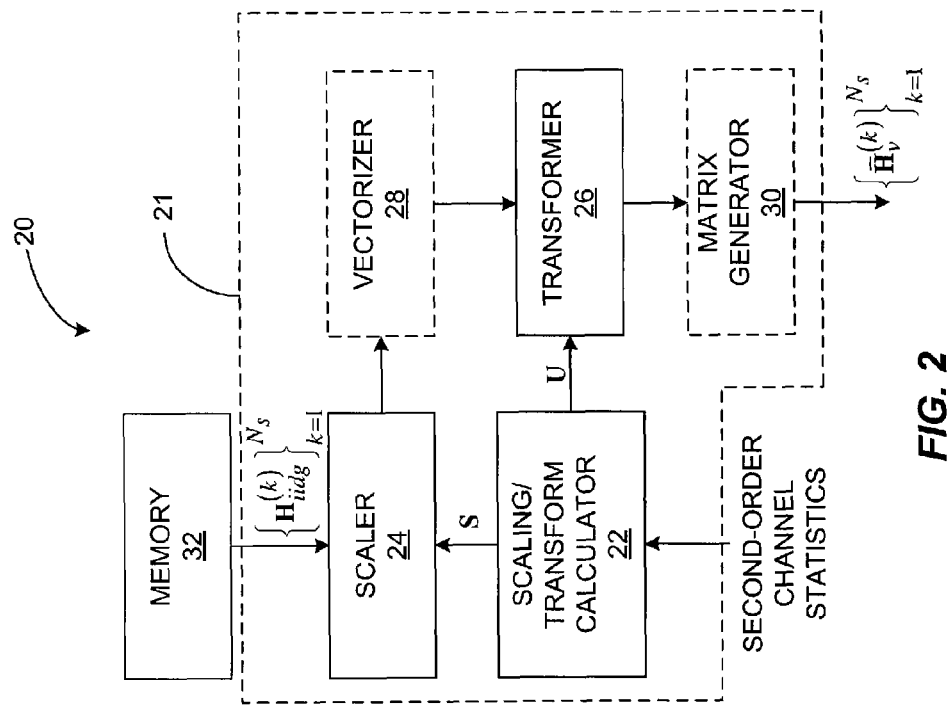
FIG. 2 is a block diagram of functional circuit elements for one or more embodiments of a transmission controller, such as shown in FIG. 1, for example.

While not a limiting example, FIG. 2 discloses an embodiment of the transmission controller 20 introduced in FIG. 1 that is advantageous in at least some circumstances. For example, at least one embodiment of the transmitter 10 includes one or more microprocessor-based circuits 21, which may include general or special purpose microprocessors, digital signal processors, or other type(s) of digital processing logic. In at least one embodiment, the transmission controller 20 comprises one or more such digital processors that are programmed to implement transmission control as a function of second-order channel statistics. For example, the transmission controller may include or have access to memory storing program instructions whose execution causes the transmission controller 20 to carry out the method. It is also contemplated to implement all or part of the desired transmission control processing in FPGAs, or other programmed element(s).

With the above in mind, FIG. 2 illustrates a functional circuit arrangement for the one or more processing circuits of the transmission controller 20, including a scaling/transform calculator 22, a scaler 24, a transformer 26, and optionally includes a vectorizer 28 and a matrix generator 30. The transmission controller 20 further includes or is associated with a storage device, e.g., one or more memory devices 32, for storing the initial set of template channel realizations, such as the set of IID Gaussian-distributed matrix samples contained in $\{H_{iigd}^{(k)}\}_{k=1}^{N_s}$, which is contemplated for one or more embodiments.

In operation, the scaling/transform calculator 22 computes the scaling matrix S and the transform matrix $U_\Phi$ (which may be based on $\Phi_{full}$ or $\Phi_{TX}$ described below). According to one embodiment, the full covariance matrix of the whitened channel, as given by $$\Phi_{full} \equiv E\left[\text{vec}(\overline{H})\text{vec}(\overline{H})^H\right], \qquad \text{Eq. (14)}$$

is made available to the transmitter 10 through a slow feedback link from the given receiver 12. In this case, the unitary transformation matrix $U_\Phi$ is the matrix whose columns are the eigenvectors of $\Phi_{full}$, while the scaling matrix S is derived from the component-wise square-root of the eigenvectors of $\Phi_{full}$ as $$[S]_{i,j} = \sqrt{\lambda_{(j-1)n_R+i}^{full}} \qquad \text{Eq. (15)}$$

for all $i \in \{1, 2, \ldots, n_R\}$ and $j \in \{1, 2, \ldots, n_T\}$. In this context, $\lambda_k^{full}$ denotes the kth eigenvalues of $\Phi_{full}$ for $k=1, 2, \ldots, n_R n_T$.

In one particularly advantageous embodiment, the transmit covariance matrix of the whitened channel is given by $$\Phi_{TX} \equiv E\left[\overline{H}\overline{H}^H\right], \qquad \text{Eq. (16)}$$

and is made available to the transmitter 10 via feedback from the given receiver 12. In this case, the unitary transformation matrix is chosen as $U_{\Phi=UTX}{}^T \otimes I_{n_R}$, where $U_{TX}$ denotes the matrix whose columns are the eigenvectors of $\Phi_{TX}$, $I_{n_R}$ denotes an $n_R$ by $n_R$ identity matrix, and $\otimes$ denotes the Kronecker product. With this formulation, the scaling matrix S is derived from the component-wise square-root of the eigenvectors of $\Phi_{TX}$ as $$[S]_{i,j} = \sqrt{\lambda_j^{TX}/n_R}, \qquad \text{Eq. (17)}$$

for all $i \in \{1, 2, \ldots, n_R\}$ and $j \in \{1, 2, \ldots, n_T\}$, where $\lambda_k^{TX}$ denotes the kth eigenvalues of $\Phi_{TX}$ for $k=1, 2, \ldots, n_T$. Note that in this embodiment, the vectorization and matrix formation steps can be omitted, i.e., the elements 28 and 30 shown in FIG. 1 can be omitted. This omission is allowed because the virtual channel realizations can be generated directly as $$\overline{H}_v^{(k)} = (S \cdot H_{iidg}^{(k)}) U_{TX}. \qquad \text{Eq. (18)}$$

The matrix $\Phi_{TX}$ can also be derived from the full channel covariance matrix $\Phi_{full}$. Specifically, the element of $\Phi_{TX}$ in the ith row and the jth column is given by the trace of the corresponding $n_R$ by $n_R$ submatrix in $\Phi_{full}$, i.e., $$[\Phi_{TX}]_{i,j} = tr\left\{[\Phi_{full}]_{1+(i-1)n_R:in_R,1+(j-1)n_R:jn_R}\right\} \qquad \text{Eq. (19)}$$

where $[A]_{m:n,l:k}$ denotes the sub-matrix of A that consists of elements from the mth row to the nth row and from the lth column to the kth column of A, inclusively.

In one or more embodiments, the transmission controller 20 is configured to use the set of virtual channel realizations $\{\overline{H}_v^{(k)}\}_{k=1}^{N_s}$ in the iterative algorithm described in Eq. (7) through Eq. (10). That is, at least one embodiment of the transmission controller 20 determines (optimal) power allocations for the transmit antennas 16 for the different eigen modes of MIMO transmission to a given receiver 12, based on the corresponding set of virtual channel realizations $\{\overline{H}_v^{(k)}\}_{k=1}^{N_s}$ as developed from the second-order statistics of the actual channel realizations for that given receiver 12.

More particularly, derivation of the virtual channel realizations from the default set of initial Gaussian-distributed channel realizations provides a sample set of channel realizations at the transmitter 10 that reflect the second-order statistics of the actual channel realizations and thus can be used for evaluating the essential quantities $\{E[MMSE_j]\}_{j=1}^{n_T}$ and $\{E[SINR_j]\}_{j=1}^{n_T}$ as follows:

$$E[MMSE_j] = \sum_{k=1}^{N_s} \frac{1}{1 + p_j \tilde{h}_{v,j}^{(k)H}\left(I + \sum_{i \neq j} p_i \tilde{h}_{v,i}^{(k)} \tilde{h}_{v,i}^{(k)H}\right)^{-1} \tilde{h}_{v,j}^{(k)}}, \qquad \text{Eq. (20)}$$

and $$E[SINR_j] = \sum_{k=1}^{N_s} \tilde{h}_{v,j}^{(k)H}\left(I + \sum_{i \neq j} p_i \tilde{h}_{v,i}^{(k)} \tilde{h}_{v,i}^{(k)H}\right)^{-1} \tilde{h}_{v,j}^{(k)}, \qquad \text{Eq. (21)}$$

for $j=1, 2, \ldots, n_T$, where $\tilde{h}_{v,i}^{(k)}$ denotes the ith column of the transformed matrix $\tilde{H}_v^{(k)} = \overline{H}_v^{(k)} U_{TX}$.

One sees that use of the virtual channel realizations $\{\overline{H}_v^{(k)}\}_{k=1}^{N_s}$ provides the transmission controller 20 with a sample set of sufficient size to accurately approximate the integrations represented in Eq. (9) and Eq. (10) via the summations presented in Eq. (20) and Eq. (21). That ability is particularly useful given that Eq. (9) and Eq. (10) depend on knowing the probability distribution function of the actual channel realizations, $p(\tilde{H})$, at the transmitter 10, and that knowledge generally is absent unless burdensome, full channel feedback is used. Thus, where the transmission controller 20 is configured to compute power allocations for transmit precoding based on one or more integrations with respect to a probability density function of the actual channel realizations, it may be advantageously configured to approximate that integration by averaging over a sample set of some or all of the virtual channel realizations.

Of course, the transmission controller 20 may base its determination of transmission control parameters other than transmit precoding weights on the virtual channel realizations. For example, in addition to or in alternative to the determination of transmit precoding weights, the transmission controller 20 may be configured to base modulation-and-coding scheme (MCS) selections for a given receiver 12 on the virtual channel realizations determined for that given receiver 12. As an example, the long-term per-stream coding rates $\{R_i\}_{i=1}^{n_T}$ for use in MISO/MIMO transmission to given receiver 12 operating with Successive-Interference-Cancellation (SIC) can be computed from $\{\overline{H}_v^{(k)}\}_{k=1}^{N_s}$ as $$R_j = \sum_{k=1}^{n_T} \log\left(1 + p_j \tilde{h}_{v,j}^{(k)H}\left(I + \sum_{i \neq j} p_i \tilde{h}_{v,i}^{(k)} \tilde{h}_{v,i}^{(k)H}\right)^{-1} \tilde{h}_{v,j}^{(k)}\right) \qquad \text{Eq. (22)}$$

for $j=1, 2, \ldots, n_T$.

Figure 3:
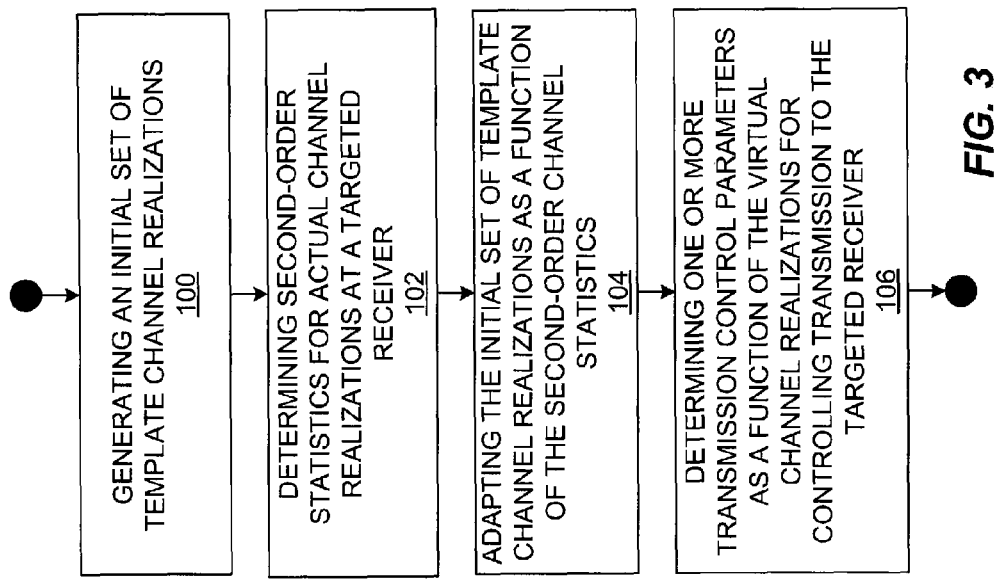
FIG. 3 is a logic flow diagram of one embodiment of a method of transmission control based on second-order channel statistics, which may be implemented in the processing logic of a transmission controller.

More broadly, it should be understood that determining transmit precoding matrices and/or making MCS selections based on virtual channel realizations stand as advantageous but non-limiting examples of transmission control as taught herein. FIG. 3 illustrates a broad method embodiment, which the transmission controller 20 may be programmed or otherwise configured to carry out. The illustrated processing implies a given sequence of steps, but transmission control as taught herein is not necessarily limited to the illustrated sequence. Further, it should be understood that all or part of the illustrated processing may be carried out on an ongoing basis or repeating basis, and may be part of a larger set of transmission control/communications processing operations at the transmitter 10.

With the above points in mind, the illustrated method of controlling transmission from a multi-antenna transmitter, e.g., transmitter 10, includes generating an initial set of "template" channel realizations that is preferably Gaussian-distributed (Step 100), determining second-order statistics for actual channel realizations at a targeted receiver (Step 102), e.g., a given one of the receivers 12, and adapting the initial set of template channel realizations as a function of the second-order channel statistics to obtain virtual channel realizations that reflect the second-order channel statistics of the actual channel realizations (Step 104). The method further includes determining one or more transmission control parameters as a function of the virtual channel realizations for controlling transmission to the targeted receiver (Step 106).

As noted, generating the initial set of template channel realizations may comprise generating them from stored values, e.g., forming a matrix having elements taken from a pre-stored set of independent-identically-distributed (IID) Gaussian samples. The set of IID Gaussian-distributed matrix samples $\{H_{iidg}^{(k)}\}_{k=1}^{N_s}$ are used in one or more embodiments, and the $\{H_{iidg}^{(k)}\}_{k=1}^{N_s}$ may be generated from pre-computed stored values. That is, the $\{H_{iidg}^{(k)}\}_{k=1}^{N_s}$ samples may be stored and copies loaded into working memory as needed.

However generated, the template channel realizations represented by $\{H_{iidg}^{(k)}\}_{k=1}^{N_s}$ are adapted through scaling and transformation to reflect the second-order statistics of the actual channel realizations at the targeted receiver 12, such as explained in the context of Eq. (13). That is, in one or more embodiments, the transmission controller 20 uses a scaling matrix S of size $n_R$ by $n_T$ and a unitary matrix $U_\Phi$ of size $n_R n_T$ by $n_R n_T$ to scale and transform the individual matrix samples $H_{iidg}^{(k)}$ into the virtual channel realizations $H_m^{(k)}$.

The second-order statistics of actual channel realizations for the given receiver 12, e.g., the covariance of the whitened channel response given in Eq. (12), may be determined based on receiving feedback from the given receiver 12. In at least one embodiment, the second-order statistics themselves are fed back. Thus, the given receiver 12 may determine the covariance of its whitened channel response and feed back that information to the transmitter 10. Alternatively, the transmitter 10 may determine the second-order statistics based on observations of a known signal from the given receiver 12. For example, the transmitter 10 may derive the second-order statistics from measurements made on an uplink pilot (or other known signal) transmitted from the given receiver 12.

Also, it should be emphasized that these techniques directly apply where the MISO/MIMO channel responses of interest have non-zero mean. For example, in such cases, in addition to the channel covariance matrix (second-order channel statistics) being fed back by the given receiver 12, or otherwise determined for it, the given receiver 12 may also feed back the long-term average or mean of the channel response (first-order statistics). The set of virtual channel realizations can be generated in the same manner as the zero-mean case, except that the mean of the channel response is added into the IID Gaussian matrix samples $\{H_{iidg}^{(k)}\}_{k=1}^{N_s}$ before the scaling and the unitary transformation.

Transmission control as taught herein further readily extends to cases where the MISO/MIMO channel responses of interest are frequency selective. For example, if a single frequency-independent precoding matrix is desired, the transmission controller 20 can be configured to apply the processing described herein in an MIMO Orthogonal Frequency Division Multiplex (OFDM) system with the definitions of $\Phi_{full}$ and $\Phi_{TX}$ being modified, respectively, as $$\Phi_{full} \equiv E\left[\sum_{k=1}^{N_f} vec(\overline{H}_f[k])vec(\overline{H}_f[k])^H\right] \quad \text{Eq. (23)}$$

$$= E\left[\sum_{n=1}^{L} vec(\overline{H}_t[n])vec(\overline{H}_t[n])^H\right],$$

and $$\Phi_{TX} \equiv E\left[\sum_{k=1}^{N_f} \overline{H}_f[k]^H \overline{H}_f[k]\right] \quad \text{Eq. (24)}$$

$$= E\left[\sum_{n=1}^{L} \overline{H}_t[n]^H \overline{H}_t[n]\right],$$

where $\overline{H}_f[k]$ denotes the frequency-domain whitened channel response at the kth subcarrier, $\overline{H}_t[n]$ denotes the corresponding nth time-domain channel tap, $N_f$ denotes the number of subcarriers in the system, and L denotes the maximum number of time-domain channel taps.

Thus, in at least one such embodiment, the transmitter 10 comprises an OFDM transmitter that is configured for operation in a wireless communication network. In this context, the transmission controller 20 is configured to determine the one or more transmission control parameters as a function of the virtual channel realizations for controlling transmission to the targeted receiver by computing transmit precoding weights for transmitting OFDM chunks from respective ones of two or more of the transmit antennas 16, based on the virtual channel realizations.

In any of its various embodiments, multi-antenna transmission control as a function of second-order channel statistics provides numerous advantages. For example, by using second-order statistics for actual channel realizations to adapt an initial set of default, Gaussian-distributed channel realizations, such that the adapted channel realizations reflect the second-order statistics, the potentially computationally-intensive and storage-demanding tasks of computing optimal long-term precoding matrix values and the corresponding long-term per-stream coding rates for MIMO transmission can be done at the transmitter rather than at the receiver. The approach further allows targeted receivers to feed back their whitened channel covariance matrices (or covariance plus mean with non-zero mean fading).

That type of feedback represents relatively compact information with lowered signaling overhead. Furthermore, the general statistical information provided by the second-order (and the first-order) channel statistics may also be used for other purposes, such as to compress the channel quality information (CQI) that is typically fed back through a fast feedback link. Moreover, in at least some embodiments, particularly where uplinks and downlinks are well correlated, the transmitter can determine the necessary statistics based on observations of known signals transmitted from the targeted receiver(s).

Figure 4:
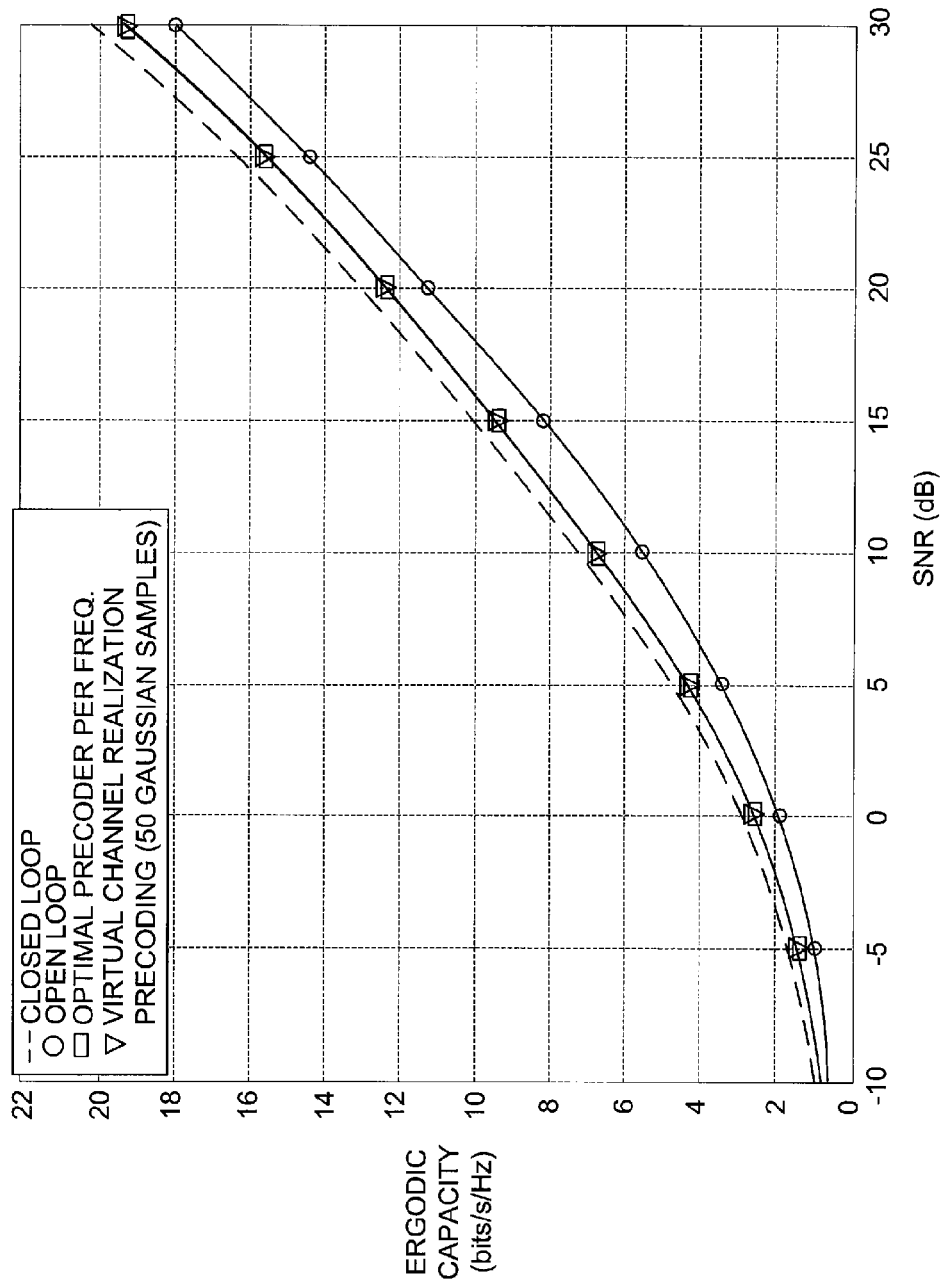
FIG. 4 is a graph illustrating an example of relative performance for one or more embodiments of transmission control as taught herein.

Despite the signaling and computational efficiencies gained, the performance of second-order statistics based transmission control as taught herein compares favorably to the ideal closed-loop capacity offered when MIMO transmission precoding matrices are computed from full, instantaneous channel state feedback. For example, FIG. 4 illustrates a performance graph where one sees the effectiveness of transmission control as taught herein for a MIMO-OFDM system. The overall system bandwidth is assumed to be 5 MHz with a Fast Fourier Transform (FFT) size of 512. The number of occupied sub-carriers is 300, which are equally divided into 25 chunks of 12 sub-carriers each. Further, the sub-carrier spacing is 15 kHz. The performance is simulated using the 3GPP spatial channel model with the pedestrian B channel profile in a micro-cell environment.

With the above assumptions and models in mind, the "+" curve represents the ergodic capacity achieved by the optimal precoding matrix as computed using the actual (instantaneous) channel realizations. The "x" curve represents the ergodic capacity achievable by a precoding matrix computed using the virtual channel realizations generated, as taught herein, based on the second-order channel statistics of the actual channel realizations. As shown in the plot, there is virtually no performance loss as compared to the more burdensome use of actual channel realizations.

With the above examples and other variations and extensions in mind, those skilled in the art will appreciate that the foregoing description and the accompanying drawings represent non-limiting examples of the methods and apparatus taught herein for transmission control based on second-order channel statistics. As such, the present invention is not limited by the foregoing description and accompanying drawings. Instead, the present invention is limited only by the following claims and their legal equivalents.

What is claimed is:

1. A method of controlling transmission from a multi-antenna transmitter comprising:
   generating an initial set of template channel realizations;
   determining second-order statistics for actual channel realizations at a targeted receiver;
   adapting the initial set of template channel realizations as a function of the second-order channel statistics to obtain a set of virtual channel realizations that reflect the second-order channel statistics of the actual channel realizations; and
   determining one or more transmission control parameters as a function of the set of virtual channel realizations for controlling transmission to the targeted receiver.

2. The method of claim 1, wherein generating the initial set of template channel realizations comprises generating the initial set of template channel realizations from pre-computed stored values.

3. The method of claim 2, wherein generating the initial set of template channel realizations from pre-computed stored values comprises forming the initial set of template channel realizations from a pre-stored set of independent-identically-distributed (IID) Gaussian matrix samples.

4. The method of claim 3, wherein adapting the initial set of template channel realizations as a function of the second-order channel statistics to obtain the set of virtual channel realizations comprises forming each virtual channel realization in the set of virtual channel realizations by scaling and transforming a template channel realization in the initial set of template channel realizations as a function of the second-order statistics, such that the set of virtual channel realizations reflect the second-order statistics of the actual channel realizations.

5. The method of claim 1, wherein determining the one or more transmission control parameters as a function of the set of virtual channel realizations comprises computing power allocations for transmit precoding from the set of virtual channel realizations.

6. The method of claim 5, wherein computing the power allocations for transmit precoding from the set of virtual channel realizations comprises iteratively computing optimal transmit antenna power allocations in dependence on an integration of a probability density function corresponding to the actual channel realizations and approximating that integration by averaging over a sample set of some or all of the set of virtual channel realizations.

7. The method of claim 1, wherein determining the one or more transmission control parameters as a function of the set of virtual channel realizations comprises selecting a modulation and coding scheme (MCS) for the targeted receiver based on the set of virtual channel realizations.

8. The method of claim 1, wherein determining the second-order statistics for the actual channel realizations at the targeted receiver comprises calculating the second order statistics based on observations of a known signal received at the transmitter from the targeted receiver.

9. The method of claim 1, wherein determining the second-order statistics for the actual channel realizations at the targeted receiver comprises determining the second-order statistics based on feedback from the targeted receiver.

10. The method of claim 9, wherein determining the second-order statistics based on the feedback from the targeted receiver comprises receiving the second-order statistics from the targeted receiver.

11. The method of claim 1, wherein determining the second-order statistics for the actual channel realizations at a targeted receiver comprises determining second-order statistics for a whitened channel response for the actual channel realizations.

12. The method of claim 11, wherein determining the second-order statistics for the whitened channel response for the actual channel realizations comprises determining a covariance of the whitened channel response.

13. The method of claim 12, wherein determining the covariance of the whitened channel response comprises receiving covariance information for the whitened channel response as feedback from the targeted receiver.

14. The method of claim 12, wherein adapting the initial set of template channel realizations as a function of the second-order channel statistics comprises scaling and transforming the initial set of template channel realizations based on the covariance of the whitened channel response.

15. The method of claim 1, wherein the transmitter comprises an Orthogonal Frequency Division Multiplex (OFDM) transmitter configured for operation in a wireless communication network, and wherein determining the one or more transmission control parameters as a function of the set of virtual channel realizations for controlling transmission to the targeted receiver comprises computing transmit precoding weights for transmitting OFDM chunks from respective ones of two or more transmit antennas based on the set of virtual channel realizations.

16. The method of claim 1, wherein the transmitter comprises a Multiple-Input-Multiple-Output (MIMO) transmitter configured for operation in a wireless communication network, and wherein determining the one or more transmission control parameters as a function of the set of virtual channel realizations for controlling transmission to the targeted receiver comprises computing transmit precoding weights for transmitting to the targeted receiver from respective ones of two or more transmit antennas based on the set of virtual channel realizations.

17. A transmission controller for a multi-antenna transmitter, said transmission controller comprising one or more processing circuits configured to:
   generate an initial set of template channel realizations;
   determine second-order statistics for actual channel realizations at a targeted receiver;

adapt the initial set of template channel realizations as a function of the second-order channel statistics to obtain a set of virtual channel realizations that reflect the second-order channel statistics of the actual channel realizations; and determine one or more transmission control parameters as a function of the set of virtual channel realizations for controlling transmission to the targeted receiver.

18. The transmission controller of claim 17, wherein the one or more processing circuits comprise one or more microprocessors and corresponding stored program instructions in a memory included in or otherwise accessible to the one or more microprocessors.

19. The transmission controller of claim 17, wherein the transmission controller includes or is associated with a storage device and is configured to generate the initial set of template channel realizations from pre-computed values stored in the storage device.

20. The transmission controller of claim 19, wherein the transmission controller is configured to generate the initial set of template channel realizations from pre-computed stored values by forming the initial set of template channel realizations from a pre-stored set of independent-identically-distributed (IID) Gaussian samples.

21. The transmission controller of claim 20, wherein the transmission controller is configured to adapt the initial set of template channel realizations as a function of the second-order channel statistics to obtain the set of virtual channel realizations by scaling and transforming an template channel realization in the initial set of template channel realizations as a function of the second-order statistics, such that set of virtual channel realizations reflect the second-order statistics of the actual channel realizations.

22. The transmission controller of claim 17, wherein the transmission controller is configured to determine the one or more transmission control parameters as a function of the set of virtual channel realizations by computing power allocations for transmit precoding from the set of virtual channel realizations.

23. The transmission controller of claim 22, wherein the transmission controller is configured to compute the power allocations for transmit precoding from the set of virtual channel realizations by iteratively computing optimal transmit antenna power allocations in dependence on an integration of a probability density function corresponding to the actual channel realizations and approximating that integration by averaging over a sample set of some or all of the set of virtual channel realizations.

24. The transmission controller of claim 17, wherein the transmission controller is configured to determine the one or more transmission control parameters as a function of the set of virtual channel realizations by selecting a modulation and coding scheme (MCS) for the targeted receiver based on the set of virtual channel realizations.

25. The transmission controller of claim 17, wherein the transmission controller is configured to determine the second-order statistics for the actual channel realizations at the targeted receiver by calculating the second order statistics based on observations of a known signal received at the transmitter from the targeted receiver.

26. The transmission controller of claim 17, wherein the transmission controller is configured to determine the second-order statistics for the actual channel realizations at the targeted receiver by determining the second-order statistics based on feedback from the targeted receiver.

27. The transmission controller of claim 26, wherein the transmission controller is configured to determine the second-order statistics based on the feedback from the targeted receiver by receiving the second-order statistics from the targeted receiver.

28. The transmission controller of claim 17, wherein the transmission controller is configured to determine the second-order statistics for the actual channel realizations at a targeted receiver by determining second-order statistics for a whitened channel response for the actual channel realizations.

29. The transmission controller of claim 28, wherein the transmission controller is configured to determine the second-order statistics for the whitened channel response for the actual channel realizations by determining a covariance of the whitened channel response.

30. The transmission controller of claim 29, wherein the transmission controller is configured to determine the covariance of the whitened channel response by receiving covariance information for the whitened channel response as feedback from the targeted receiver.

31. The transmission controller of claim 28, wherein the transmission controller is configured to adapt the initial set of template channel realizations as a function of the second-order channel statistics by scaling and transforming the initial set of template channel realizations based on the covariance of the whitened channel response.

32. The transmission controller of claim 17, wherein the transmitter comprises an Orthogonal Frequency Division Multiplex (OFDM) transmitter configured for operation in a wireless communication network, and wherein the transmission controller is configured to determine the one or more transmission control parameters as a function of the set of virtual channel realizations for controlling transmission to the targeted receiver by computing transmit precoding weights for transmitting OFDM chunks from respective ones of two or more transmit antennas based on the set of virtual channel realizations.

33. The transmission controller of claim 17, wherein the transmitter comprises a Multiple-Input-Multiple-Output (MIMO) transmitter configured for operation in a wireless communication network, and wherein the transmission controller is configured to determine the one or more transmission control parameters as a function of the set of virtual channel realizations for controlling transmission to the targeted receiver by computing transmit precoding weights for transmitting to the targeted receiver from respective ones of two or more transmit antennas based on the set of virtual channel realizations.

* * * * *

UNITED STATES PATENT AND TRADEMARK OFFICE
CERTIFICATE OF CORRECTION

PATENT NO.       : 8,718,165 B2
APPLICATION NO.  : 11/763192
DATED            : May 6, 2014
INVENTOR(S)      : Hui et al.

It is certified that error appears in the above-identified patent and that said Letters Patent is hereby corrected as shown below:

On the Title Page, in Item (57), under "ABSTRACT", in Column 2, Line 9, delete "preceding." and insert -- precoding. --, therefor.

In the Specification

In Column 3, Line 53, delete "preceding values." and insert -- precoding values. --, therefor.

In Column 3, Line 54, delete "preceding weights" and insert -- precoding weights --, therefor.

In Column 5, Line 31, delete "preceding" and insert -- precoding --, therefor.

In Column 5, Line 55, in Equation (12), delete "$\tilde{H} \equiv R_w^{-1/2} H.$" and insert -- $\overline{\mathbf{H}} \equiv \mathbf{R_w}^{-1/2} \mathbf{H}.$ --, therefor.

In Column 5, Line 63, delete "preceding" and insert -- precoding --, therefor.

In Column 8, Line 20, delete "$\tilde{H}_v^{(k)} = \tilde{H}_v^{(k)} U_{TX}.$" and insert -- $\tilde{\mathbf{H}}_v^{(k)} = \overline{\mathbf{H}}_v^{(k)} \mathbf{U}_{TX}.$ --, therefor.

In Column 8, Line 32, delete "preceding" and insert -- precoding --, therefor.

In Column 8, Line 41, delete "preceding" and insert -- precoding --, therefor.

Signed and Sealed this
Twenty-seventh Day of January, 2015

Michelle K. Lee
*Deputy Director of the United States Patent and Trademark Office*

CERTIFICATE OF CORRECTION (continued)
U.S. Pat. No. 8,718,165 B2

In Column 8, Line 58, delete "preceding" and insert -- precoding --, therefor.

In Column 9, Line 60, delete "$\{H_{iidg}^{(k)}\}_{k=1}^{N}$" and insert -- $\{\mathbf{H}_{iidg}^{(k)}\}_{k=1}^{N_s}$ --, therefor.

In Column 10, Line 22, delete "$N_j$" and insert -- $N_f$ --, therefor.

In Column 10, Line 31, delete "preceding" and insert -- precoding --, therefor.

In Column 11, Line 10, delete "preceding" and insert -- precoding --, therefor.

In Column 11, Line 12, delete "preceding" and insert -- precoding --, therefor.